May 31, 1955    W. L. TANCRED    2,709,728
RELAY

Filed June 7, 1950    2 Sheets-Sheet 1

Inventor
William L. Tancred
by Wright, Brown, Quinby & May
Attys.

May 31, 1955  W. L. TANCRED  2,709,728
RELAY
Filed June 7, 1950  2 Sheets-Sheet 2

Inventor
William L. Tancred
by Wright Brown Quinby May
Attys.

United States Patent Office 2,709,728
Patented May 31, 1955

2,709,728

RELAY

William L. Tancred, Hartford, Conn., assignor to The W. N. Borg Corporation, Hartford, Conn., a corporation of Connecticut Application June 7, 1950, Serial No. 166,693

12 Claims. (Cl. 200—87)

This invention relates to relays and has for one object to produce a relay whereby a circuit is closed on energization of a solenoid and which is not liable to accidental closure of the circuit by reason of the position of the relay, vibration, or other fortuitous condition.

A further object of the invention is to provide a relay in which the circuit closing means is always biased under spring pressure to either open or closed normal condition, so that it assumes normal condition automatically as soon as the force closing it is released.

Another object is to so form and mount the circuit-closing element that it retains good conductivity over long periods and has a large contact surface.

Still another object is to so form and mount the circuit-closing element that the contact may be made or broken at two places.

Still another object is to so form the circuit-closing mechanism that it can be removed for inspection when desired.

Another object is to provide a relay suitable for applications requiring extremely high frequencies.

Another object is to provide a relay suitable for applications requiring silent operation.

Still another object is to provide a relay having the foregoing advantages and which can control a multiplicity of circuits simultaneously.

Further objects and advantages will appear from a description of certain embodiments shown in the accompanying drawings in which.

Figure 5:
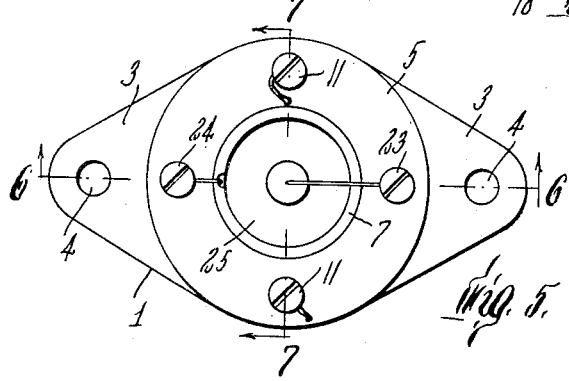
Figure 5 is a top plan view of a relay provided with the parts shown in Figures 1 to 4.
Figure 6:
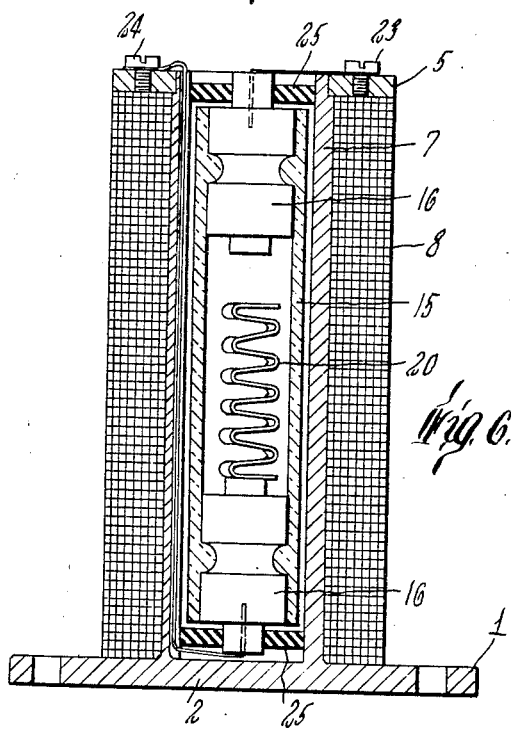
Figure 2:
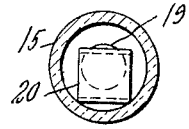
Figure 2 is a detail sectional view on line 2—2 of Figure 1.
Figure 4:
Figure 4 is a detail sectional view on line 4—4 of Figure 3.
Figure 7:
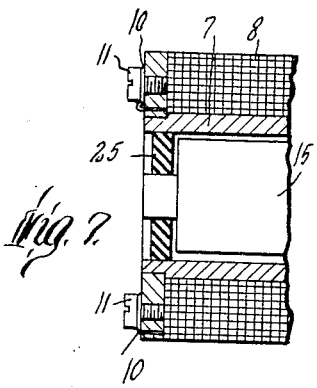

Figures 6 and 7 are sectional views on lines 6—6 and 7—7, respectively, of Figure 5.

Figure 1:
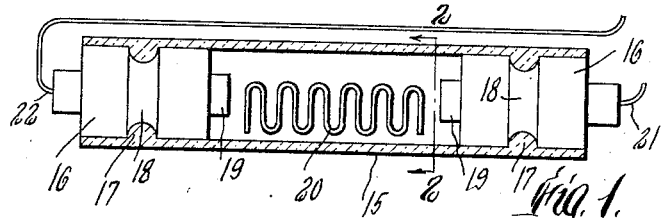
Figure 1 is a longitudinal central sectional view through the circuit-closing portion of the relay, the parts being shown in circuit-open position.
Figure 3:
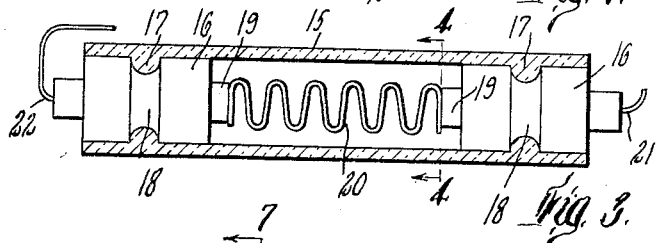
Figure 3 is a view similar to Figure 1 but showing the parts in circuit-closed condition.
Figure 8:
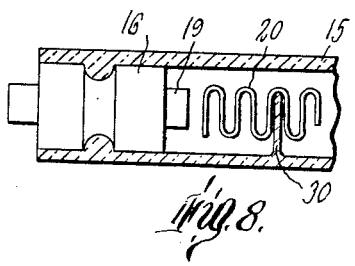

Figure 8 is a fragmentary view similar to a portion of Figure 1, but showing a modification.

Figure 9:
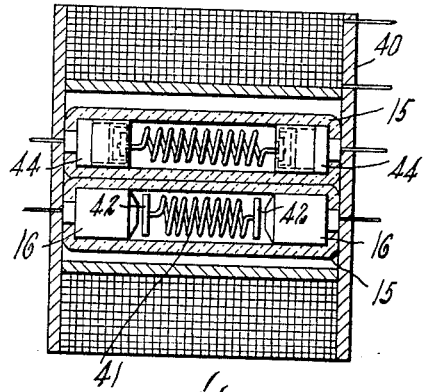

Figure 9 is a central longitudinal sectional view through a multiple circuit controlling relay including both normally open and normally closed control circuits.

Figure 10:
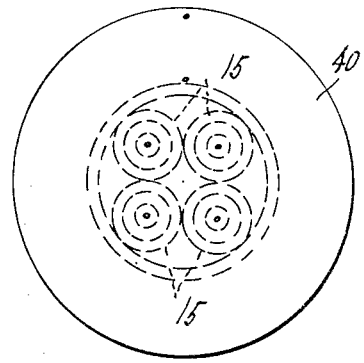

Figure 10 is a left end elevation of the structure shown in Figure 9.

Figure 11:
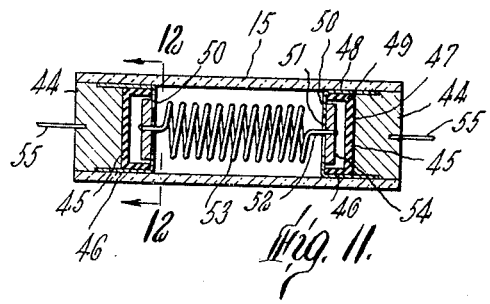

Figure 11 is a central longitudinal sectional view through a normally closed controlling switch forming a portion of the relay.

Figure 12:
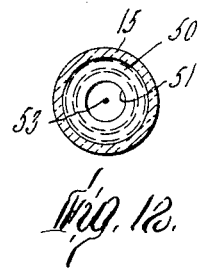

Figure 12 is a sectional view on line 12—12 of Figure 11.

Figure 13:

Figure 13 is a side elevation of a circuit controlling spring.

Figure 14:
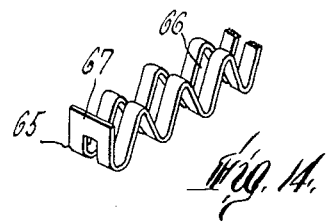

Figure 14 is a perspective view of a different form of circuit controlling spring.

Figure 15:
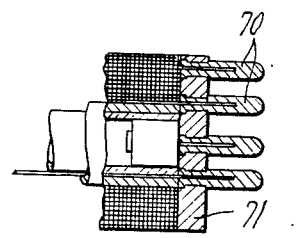

Figure 15 is a fragmentary sectional view showing one form of relay terminal.

Referring to Figures 1 to 6, at 1 is indicated a spool having a base flange 2 provided with ears 3 by which it may be secured to a suitable support, as by screws passing through perforations 4 therethrough. The upper flange of the spool is formed by a ring 5. Between the flanges of the spool and surrounding the barrel portion 7 thereof is a solenoid 8, and as shown best in Figures 5 and 7, the ends of the solenoid wire may be brought out and secured to washers 10 through which are passed binding screws 11 threaded into the ring 5. These binding screws may be connected to any suitable source of current by which the solenoid may be energized or de-energized at will. Within the solenoid is arranged the mechanism for making and breaking a circuit.

As shown in Figures 1 to 4 and 6, this circuit making and breaking mechanism may comprise a tubular casing 15 having its opposite ends closed by pole pieces 16. The tubular casing may well be of transparent material such as glass or a suitable plastic such as polymerized methyl methacrylate, and the casing and the pole pieces may be secured together as by an internal rib 17 on the casing engaging in a peripheral groove 18 in each of the pole pieces so as to form between the pole pieces, which are spaced apart, a chamber into which can be introduced an inert gas such as helium or nitrogen. By the employment of a transparent tube and so mounting it that it can be easily viewed, inspection of the circuit-closing mechanism is facilitated. Each of the pole pieces is of magnetic material, such as iron, and as shown is provided with a contact boss 19, these bosses facing each other and lying substantially coaxially within the casing 15. Also contained within the casing between the pole pieces is a contact spring 20. At least the end portions of this spring which face the pole piece bosses 19 are formed of magnetic material such that when the pole pieces are subjected to a magnetic field, these end portions are drawn into contact therewith from the position shown in Figure 1 to that shown in Figure 3. For ease in manufacture, however, the entire spring may be formed of such magnetic and conducting material, as, for example, irons but for the purpose of increasing its electrical conductivity and in order to maintain low contact resistance between it and the pole pieces, this spring and the pole pieces, particularly at the bosses 19 may be plated as with silver, or the like.

The two pole pieces are arranged in the circuit which it is desired to close, one terminal 21 being in one of the pole pieces and the other terminal 22 in the opposite pole piece, but for convenience in assembling the relay in a circuit, both terminals 21 and 22 are secured to the terminal screws 23 and 24, respectively, in the one end ring 5 as shown in Figures 5 and 6. Rubber or other shock-proof washers 25 may be employed at each end of the tubular casing within the solenoid barrel 7.

With this construction it will be evident that the conducting spring 20, herein shown as an undulous spring, but which may be of any desired extensible form, is normally of insufficient length to bridge the pole piece bosses 19, but whenever the solenoid 8 is energized, thus subjecting the pole pieces and the spring to a magnetic field, the spring is extended into contact with both of the pole piece bosses 19, thus closing a circuit between the pole pieces and between the terminal screws 23 and 24.

While in Figure 6 the relay is shown as arranged in upright position, the contact spring 20 dropping into contact with the lower pole piece 16 and being normally out of contact with the upper pole piece, it should be clear that the particular position in which the solenoid is placed is quite immaterial, since it will operate equally as well in a horizontal or in an inclined position, and since the contact spring is normally of insufficient length to bridge the pole pieces, it cannot accidentally contact with both at the same time and close the circuit. It will also be apparent that as soon as the solenoid is deenergized, the contact is broken between the spring and one or both of the pole pieces under the force of the spring, so that a positive breaking of the circuit is produced.

In some cases it may be desirable to prevent the spring from moving freely within the tubular casing, as, for example, when it is subject to vibration which might tend to produce wear between the contacting faces of the spring and its pole pieces, and also it may sometimes be desired to insure the making and breaking of the control circuit at two points. To these ends, the intermediate portion of the spring may be held against undesired motion, as, for example, by a fin 30 extending inwardly from the tubular casing at a point intermediate its ends and projecting in between adjacent parts or undulations of the spring as shown in Figure 8. This will insure against the spring remaining in contact with either of its pole pieces whenever the controlling solenoid is deenergized, even should the relay be placed in the vertical position shown in Figure 6, but this fin 30 does not interfere with the free movement of the ends of the spring into or out of contact with the pole pieces in response to energization or deenergization of the solenoid. Since the ends of the contact spring may be made of substantial area and may be made to engage flat against the contact bosses 19 of the pole pieces, large areas of contact for the passage of current may be had, and since the spring may be enclosed in an inert atmosphere, arcing when breakage of the contact occurs, is minimized.

Figures 9 and 10 illustrate a relay adapted to control a plurality of circuits simultaneously. To this end the controlling solenoid 40 houses a plurality of casings 15 each containing its spaced pole pieces and switch spring. As shown in Figure 9, the lower one of these casings 15 carries pole pieces such as 16, which, when the solenoid is energized, extend a spring 41 so that end plates 42 thereon contact with the pole pieces 16 and close a circuit therethrough, this switch being normally an open switch of the type shown in Figures 1 to 8, but employing, as shown, a coil spring 41 in place of the spring 20.

The other or upper casing 15 in this figure carries a normally closed switch and this closed switch may be constructed as shown in Figures 11 and 12. Referring to these figures, the conductive pole pieces 44 of magnetic material have positioned on their inner faces a pair of cups 45 and 46. Each of the cups 45 is of insulating material and comprises a base 47 which covers the inner faces of the pole pieces 44 and a marginal flange 49. The cups 46 are of conducting material and each has a marginal flange 48 turned outwardly, surrounding the marginal flange 49 of the insulating cup. This flange 48 is seated in a counterbored portion at the inner end of each of the pole pieces and makes electrical connection therewith. The base 50 of each of the conducting cups is formed with a central aperture 51 through which may extend out of contact with the cups the adjacent end 52 of a spring 53. This spring 53 at each end carries a conductive disk 54 which is normally pressed against the outer face of the conducting base 50 by the spring 53, thus insuring electrical conductivity from one to the other of the pole pieces 44 through each conducting cup 49, its base 50, the disks 46 and the spring 53. The parts are so proportioned, however, that whenever the solenoid is energized, the disks 54 are drawn away from contact with the conducting bases 50 and strike against the insulation cup bases 45, thus breaking the electrical connection from one to the other of the pole pieces 44. This form of switch is therefore normally closed, the spring 53 acting normally to hold the disks 54 into electrical contact with the conducting cups 46, but by energization of the solenoid, the electrical connection is broken. Each of the pole pieces 44 is provided with terminal wires 55. The metal parts of the normally closed switch, particularly when contact is made or broken, may be plated with silver or the like as previously suggested.

It will be seen that by providing any desired number of casings, each with its switch elements, whether normally open or closed, within a single controlling solenoid, any desired number of switches, whether normally open or normally closed may be controlled simultaneously by energization or deenergization of the solenoid. As shown in Figure 10, four such circuit-controlling elements are associated with a single solenoid.

In Figures 13 and 14 spring constructions are illustrated of the non-inductive type each comprising a pair of parallel conductive portions. In Figure 13 these portions are provided by a pair of spring wire portions 60 coiled together, while in Figure 14 a similar result is accomplished in a sinuous leaf spring 65 by forming a central slot 66 therethrough which divides the spring element into two parallel portions between terminal end portions, one of which is shown at 67. Such springs are either of magnetic material or are attached to magnetic material end portions which may be pulled toward the pole pieces when the solenoid is energized.

In Figure 15 a further modification is shown in which the electrical terminals for the actuating solenoid and for the circuit-controlling elements actuated thereby are brought out into prongs 70 carried by the solenoid spool end 71. These prongs may be employed in connection with a base having similarly arranged openings and carrying conducting elements suitably arranged thereon. By this means the entire relay may be plugged in or out by merely plugging in its prongs 70 or removing them from the base in a manner similar to the usual method in connection with the mounting of electronic tubes and similar parts on their supporting bases.

From the foregoing description of certain embodiments of this invention, it will be evident to those skilled in the art that other further changes and modifications may be made without departing from its spirit or scope.

I claim:

1. A relay comprising a solenoid, a pair of pole pieces of conductive magnetic material spaced apart and forming portions of a core for said solenoid, and a circuit-closing element of resilient conductive material interposed between said pole pieces and normally of less length than the space therebetween, said element having magnetic material end portions adapted to be drawn toward said pole pieces against the resilient pull of said element upon energization of said solenoid, said pole pieces and circuit-closing element forming a portion of a switch actuated by the energizing and de-energizing of said solenoid.

2. A relay comprising a solenoid, a pair of pole pieces of conductive magnetic material spaced apart and forming portions of a core for said solenoid, and a circuit-closing element of resilient conductive material and presenting a plurality of parallel conductive paths interposed between said pole pieces and normally of less length than the space therebetween, said element having magnetic material end portions adapted to be drawn toward said pole pieces against the resilient pull of said element upon energization of said solenoid, said pole pieces and circuit-closing element forming a portion of a switch actuated by the energizing and de-energizing of said solenoid.

3. A relay comprising a solenoid, a pair of pole pieces of magnetic material spaced apart and forming portions of a core for said solenoid, and a circuit-closing element of resilient conductive material interposed between said pole pieces and normally of less length than the space therebetween, said element having magnetic material end portions adapted to be drawn into contact with said pole pieces against the resilient pull of said element on energization of said solenoid to thereby electrically connect said pole pieces.

4. A relay comprising a tubular casing, pole pieces of magnetic material spaced apart within said casing, and an extensible conducting spring within said casing and normally of insufficient length to connect said pole pieces, said spring having at least its end portions of magnetic material to be pulled into electrical contact with said pole pieces when said pole pieces are subjected to a magnetic field.

5. A relay comprising a tubular casing, pole pieces of magnetic material spaced apart within said casing, and an extensible conducting spring of magnetic material within said casing and normally of insufficient length to contact simultaneously with both of said pole pieces but extendible into contact therewith when said pole pieces and spring are subjected to a magnetic field.

6. A relay comprising a tubular casing, pole pieces of magnetic material spaced apart within said casing, an extensible conducting spring within said casing and normally of insufficient length to connect said pole pieces, said spring having at least its end portions of magnetic material to be pulled into electrical contact with said pole pieces when said pole pieces are subjected to a magnetic field, and means carried by said casing and engaging an intermediate portion of said spring for retaining said spring in position with both ends being normally out of contact with said pole pieces.

7. A relay comprising a solenoid, a transparent tube arranged coaxially within said solenoid, a magnetic pole piece secured in each end portion of said tube, said pole pieces being spaced apart, an extensible circuit-closing element having at least its end portions of magnetic material within said tube and normally of less length than the space between said pole pieces but extensible into contact with both said pole pieces on energization of said solenoid, and cushioning elements for retaining said tube within said solenoid.

8. A relay comprising a solenoid, a transparent tube arranged coaxially within said solenoid, a magnetic pole piece secured in each end portion of said tube, said pole pieces being spaced apart, an extensible circuit-closing element having at least its end portions of magnetic material within said tube and normally of less length than the space between said pole pieces but extensible into contact with both said pole pieces on energization of said solenoid, conductors leading from said pole pieces to terminals at one end of said solenoid, and cushioning elements for retaining said tube within said solenoid.

9. A relay comprising a solenoid, a pair of pole pieces of conductive magnetic material spaced apart and forming portions of a core for said solenoid, and a circuit-closing element of resilient conductive material interposed between said pole pieces and normally of less length than the space therebetween, said element having magnetic material end portions adapted to be drawn toward said pole pieces against the resilient pull of said element upon energization of said solenoid, said pole pieces being provided with insulation against which said end portions contact when said solenoid is energized and having contact portions spaced from said insulation and in electrical connection with said end portions when said solenoid is de-energized through the resilience of said element.

10. A relay comprising a solenoid, a pair of conducting pole pieces of magnetic material spaced apart axially within said solenoid, an insulation cup having a base engaging the inner face of each pole piece and a marginal annular flange, a cup of conducting material enclosing each insulation cup and having an outwardly directed annular flange enclosing the flange of its insulating cup and in electrical connection with its respective pole piece, said conducting material cup having a central aperture through its base, a conducting disk of magnetic material enclosed by each pair of cups, and a spring joining said disks and extending through said apertures and out of contact with said conductive cup and of a length to normally hold said disks in electrical contact with the bases of said conductive cups and spaced from the bases of said insulation cups, and extensible to permit said disks to be drawn out of contact with said conductive cups and against the bases of said insulation cups when said solenoid is energized.

11. A relay comprising a solenoid, a plurality of tubular casings within said solenoid, each of said casings having a pair of conductive pole pieces of magnetic material spaced apart therein, each of said casings having a spring of conductive material and provided with at least its end portions of magnetic conductive material positioned to be drawn toward each adjacent pole piece on energization of said solenoid and to be drawn away therefrom by the resilience of said spring when said solenoid is deenergized, each of said pair of pole pieces and its spring forming a switch for controlling a circuit when said solenoid is energized or de-energized.

12. A relay comprising a pair of axially spaced solenoid cores, a pair of armatures positioned between said cores and adapted to contact therewith on magnetization of said cores, means for magnetizing said cores, and a spring connecting said armatures and normally spacing the outer faces of said armatures by less than the space between said cores.

References Cited in the file of this patent

UNITED STATES PATENTS

| | | |
|---|---|---|
| 2,001,579 | Leece et al. | May 14, 1935 |
| 2,015,156 | Richmond | Sept. 24, 1935 |
| 2,288,451 | Harrison | June 30, 1942 |
| 2,495,633 | Hayward | Jan. 24, 1950 |
| 2,510,700 | Lamb | June 6, 1950 |

FOREIGN PATENTS

| | | |
|---|---|---|
| 699,682 | Germany | Dec. 4, 1940 |